(12) United States Patent
Furukawa et al.

(10) Patent No.: US 9,154,981 B2
(45) Date of Patent: Oct. 6, 2015

(54) TRANSMISSION PERIOD DETERMINATION METHOD, TRANSMISSION PERIOD DETERMINATION DEVICE AND PROGRAM

(75) Inventors: Hiroshi Furukawa, Fukuoka (JP); Guangri Jin, JiLin (CN)

(73) Assignee: Kyushu University, National University Corporation, Fukuoka (JP)

( * ) Notice: Subject to any disclaimer, the term of this patent is extended or adjusted under 35 U.S.C. 154(b) by 130 days.

(21) Appl. No.: 14/000,007

(22) PCT Filed: Feb. 17, 2012

(86) PCT No.: PCT/JP2012/053788
§ 371 (c)(1),
(2), (4) Date: Oct. 11, 2013

(87) PCT Pub. No.: WO2012/111796
PCT Pub. Date: Aug. 23, 2012

(65) Prior Publication Data
US 2014/0022934 A1    Jan. 23, 2014

(30) Foreign Application Priority Data

Feb. 18, 2011 (JP) ................................. 2011-033851

(51) Int. Cl.
*H04W 24/06* (2009.01)
*H04W 16/22* (2009.01)
*H04W 84/18* (2009.01)

(52) U.S. Cl.
CPC .............. *H04W 24/06* (2013.01); *H04W 16/22* (2013.01); *H04W 84/18* (2013.01)

(58) Field of Classification Search
CPC ... H04W 24/06; H04W 16/22; H04W 16/225; H04W 16/00; H04W 16/04; H04W 56/00; H04W 56/001; H04W 56/0045; H04W 72/00; H04W 56/0075; H04W 56/009; H04L 12/1877; H04L 2025/0375; H04L 2025/03764; H04L 2025/0377; H04L 41/14

USPC ................ 370/241, 252, 254–255, 310–350
See application file for complete search history.

(56) References Cited

U.S. PATENT DOCUMENTS

| 8,161,341 B2 * | 4/2012 | Lee et al. ....................... 714/748 |
| 8,917,712 B2 * | 12/2014 | Yokoyama ..................... 370/350 |
| 8,964,721 B1 * | 2/2015 | Liu et al. ....................... 370/348 |

(Continued)

FOREIGN PATENT DOCUMENTS

| BR | 0214831 | 1/2005 |
| CA | 2469707 | 6/2003 |

(Continued)

OTHER PUBLICATIONS

International Search Report dated Mar. 19, 2013 filed in PCT/JP2012/053788.

*Primary Examiner* — Warner Wong
(74) *Attorney, Agent, or Firm* — Rankin, Hill & Clark LLP (57) ABSTRACT

A transmission period determination method, etc. capable of setting IPT transmission period by using general-purpose wireless modules and existing drivers is provided. A wireless communication system is a wireless backhaul. A route is established from a core node to a slave node. The core node assigns a specified transmission period and transmits a plurality of training packets to the slave node. The slave node transmits, to a transmission period determination device, the number of training packets received first and last and the number of training packets received without overlap. An estimation unit estimates a training time, the time for the slave node to receive the training packets. A calculation unit calculates a training metric candidate. An updating unit compares the values of the current training metric and the training metric candidate to determine the IPT transmission period.

4 Claims, 7 Drawing Sheets

(56) References Cited

U.S. PATENT DOCUMENTS

| | | |
|---|---|---|
| 2003/0142629 A1 | 7/2003 | Krishnamurthi et al. |
| 2008/0049601 A1* | 2/2008 | Tzannes et al. ............... 370/208 |
| 2008/0311949 A1* | 12/2008 | Koskinen et al. ............. 455/525 |

FOREIGN PATENT DOCUMENTS

| | | |
|---|---|---|
| CN | 1618243 | 5/2005 |
| EP | 1452048 | 9/2004 |
| EP | 2211572 | 7/2010 |
| JP | 2005-039722 | 2/2005 |
| JP | 2005-512473 | 4/2005 |
| JP | 2007-049602 | 2/2007 |
| JP | 2008-258877 | 10/2008 |
| JP | 4496336 | 7/2010 |
| NO | 329036 | 8/2010 |
| WO | 03/051076 | 6/2003 |

\* cited by examiner

TRANSMISSION PERIOD DETERMINATION METHOD, TRANSMISSION PERIOD DETERMINATION DEVICE AND PROGRAM

TECHNICAL FIELD

The present invention relates to a transmission period determination method, a transmission period determination device and a program, and in particular, relates to a transmission period determination method for determining a transmission period in an intermittent periodic transmit system where a source node transmits packets at the transmission period to a destination node.

BACKGROUND ART

In a next generation mobile communication system, a system capacity as much as hundreds of Mbps is necessary. To realize this system capacity, a large number of groups of small cell base stations which cover areas of dozens of meters in radius have to be laid. The cost for such a large number of base stations is hard to afford. Wireless backhaul radically reduces the cost for laying cables necessary for installing the system by forwarding packets between base stations via multihop network. One could say that wireless backhaul is the only solution to the cost problem.

A wireless backhaul includes some core nodes and pluralities of slave nodes. Only core nodes are connected with backbone network via cables. Each slave node is connected to the backbone network by wireless multihop forwarding to a core node. Such a constitution realizes laying base stations at low cost and easy rearrangement or addition of base stations.

Figure 6:
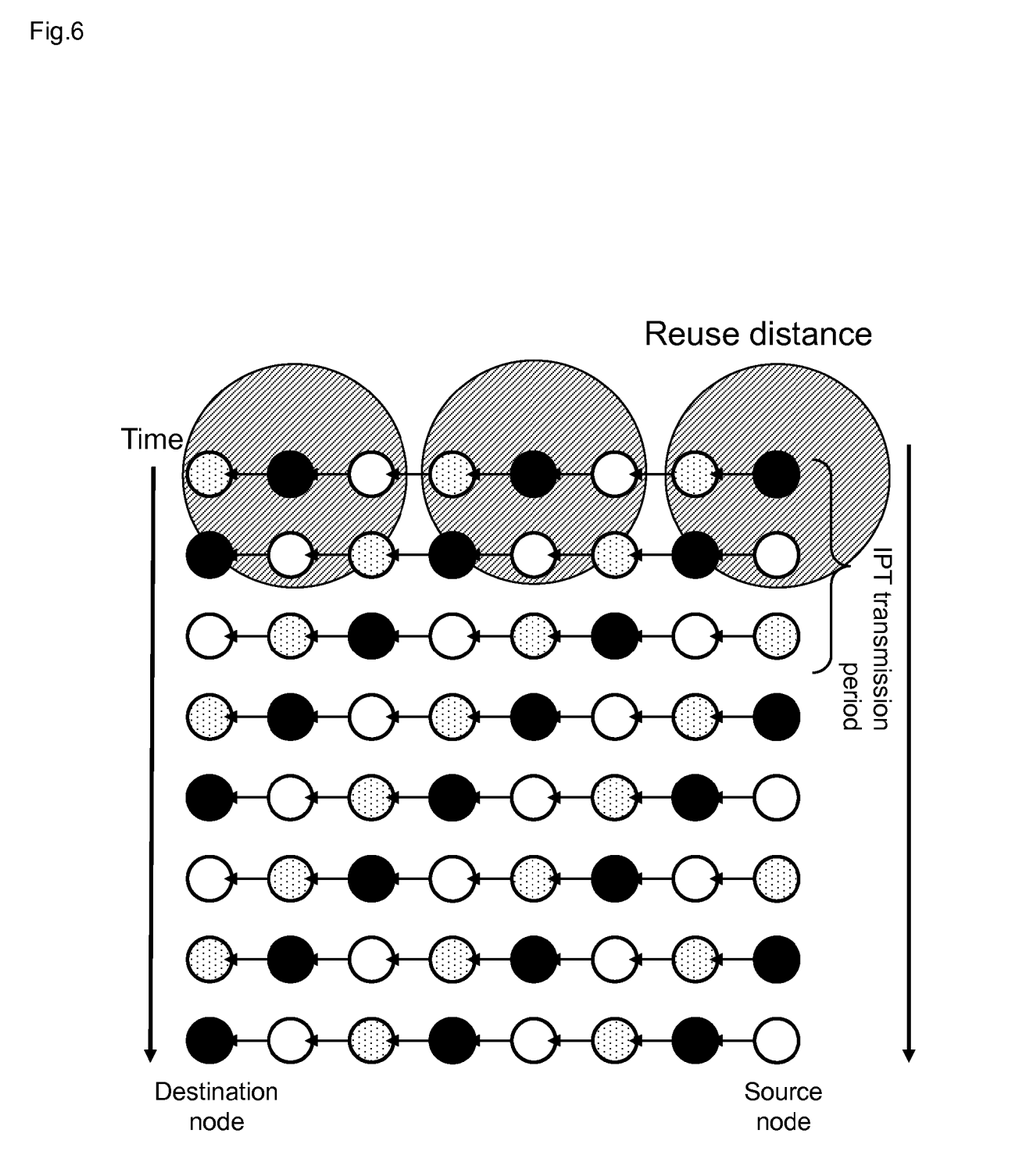
FIG. 6 is a schematic diagram showing intermittent periodic transmit (IPT) method proposed by the present inventors.

The performance of a wireless backhaul is determined by the efficiency of forwarding packets between nodes. The present inventors have proposed Intermittent Periodic Transmit (IPT) for increasing the efficiency of forwarding packets in a wireless backhaul (See Patent Literature 1, Non Patent Literature 1 and so on). In a wireless backhaul, the network forwarding performance deteriorates mainly by packet collision caused by two nodes interfering each other when they transmit packets at the same time. In IPT, a source node transmits packets to a destination node at a particular period (IPT transmission period). When each node on a routing path receives a packet, it forwards the packet immediately to the next node. By making a source node transmit packets at a particular period, it is possible to control a frequency reuse distance, which is a distance of two nodes which can transmit packets at the same time without packet collision (See FIG. 6).

A frequency reuse distance is proportional to IPT transmission period. If an IPT transmission period is more than a particular value, the interference between transmission source nodes can be avoided. When IPT transmission period is set to just a threshold value, the throughput from the source node to the destination node becomes maximum. Thus, IPT transmission period is the most important parameter to adopt IPT in a wireless backhaul. Inadequate value of IPT transmission period cannot realize the optimal performance of the system. Here, IPT transmission period is influenced by surrounding environment, the installation site or antenna direction of each node, and so on. Therefore, it is difficult to set an adequate value of IPT transmission period. The method to determine IPT transmission period automatically is desired.

Figure 7:
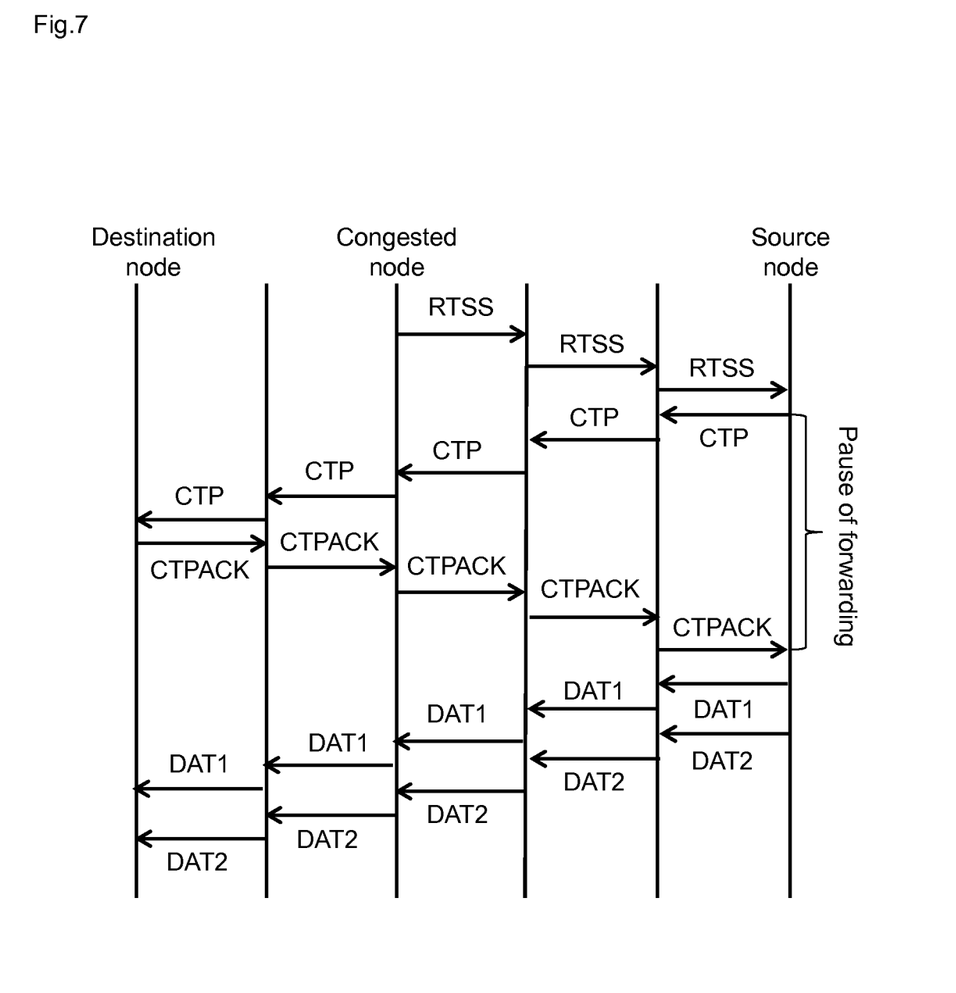
FIG. 7 is a schematic diagram showing a conventional process for determining IPT transmission period.

In Patent Literature 1 and Non Patent Literature 1, the protocols to calculate IPT transmission period automatically for a wireless backhaul are proposed. More specifically, three kinds of packets (RTSS (Request To Stop Sending) packet, CTP (Clear To Pilling up) packet, and CTPACK (CTP ACKnowledgement) packet) are defined. Referring to FIG. 7, conventional period determination process is described. (1) A source node transmits packets at a particular transmission interval to a destination node. (2) During forwarding packets, the flow of packets can be interrupted at a forwarding node by interference or the like. The node where interruption has occurred (a congested node in FIG. 7) immediately stops forwarding packets and transmits an RTSS packet to the source node. (3) When a source node receives the CTP packet, the source node transmits a CTP packet. When each forwarding node receives the CTP packet, each of the forwarding nodes clears up packets. Then, all the packets in the routing path is cleared up. (4) When a destination node receives the CTP packet, the destination node transmits a CTPACK packet to the source node. (5) The source node stops transmitting packets during the period of transmitting the CTP packet to receiving the CTPACK packet. When the source node receives the CTPACK packet, the source node restarts to transmit packets (packets DAT1, DAT2 . . . ) at a little more transmission interval. By repeating the process from (1) to (5) until packet collision does not occur, the transmission interval between each slave node converges to a certain value. The converged value is determined as the IPT transmission period of the destination node.

CITATION LIST

Patent Literature

[Patent Literature 1]
Japanese Patent No. 4496336.

Non Patent Literature

[Non Patent Literature 1]
Higa et al., "A Highly Efficient Packet Forwarding Scheme for Wireless Multihop Networks with String Topology." IEICE, B, Vol. J90-B, No. 12, 2007.

SUMMARY OF INVENTION

Technical Problem

However, the techniques described in Patent Literature 1 and Non Patent Literature 1 have the following problems. That is, (1) RTSS packet, CTP packet, and CTPACK packet are not defined in the specifications of IEEE802.11. These packets needs to be newly defined as MAC layer packets. Thus, it is difficult for a universal wireless module to implement these packets. (2) Transmission and reception status of packets (success or failure) is judged by checking the status of MAC layer in a wireless module. However, the driver of a conventional wireless module (a MadWiFi driver, for example) does not provide this function. (3) The calculated IPT transmission period does not confirm that the throughput of the system becomes the maximum value. To solve these problems, a new protocol is necessary for setting IPT transmission period.

Accordingly, it is a purpose of the present invention to provide a transmission period determination method for setting IPT transmission period for a universal wireless module with conventional driver or the like.

Solution to Problem

The first aspect of the present invention is a transmission period determination method for determining a transmission period in an intermittent periodic transmit system where a source node transmits a packet at the transmission period to a destination node, comprising transmitting a plurality of training packets at a transmission interval D from the source node to the destination node; estimating training time T required for the plurality of training packets received by the destination node, based on a first training packet received by the destination node during training operation time and on a last training packet received by the destination node during the training operation time; calculating a training metric candidate New_TM based on the training time T; and updating by comparing a value of training metric TM and the training metric candidate New_TM, and if the training metric candidate New_TM is larger than the training metric TM, by setting value of the training metric candidate New_TM to value of the training metric TM, changing the transmission interval D, and performing the transmitting again, and if the training metric candidate New_TM equals to the training metric or less, by determining the transmission period.

The second aspect of the present invention is the transmission period determination method of the first aspect, wherein the estimating further includes estimating time points $T_{start}$ and $T_{end}$ which are time points for the destination node to receive the first training packet transmitted first by the source node and the last training packet transmitted last by the source node, respectively, and estimating the training time T as $T_{end}-T_{start}$; and wherein the calculating further includes calculating the training metric candidate New_TM based on ratio of the training time T and a number Num of training packets received without overlap by the destination node.

The third aspect of the present invention is the transmission period determination method of the second aspect, wherein the estimating further includes the training time T based on (eq4) for a number N of the training packets transmitted from the source node, and sequences Seq1 and Seq2 by which the first training packet and the last training packet are transmitted from the source node, respectively; wherein the calculating further includes calculating the training metric candidate New_TM based on (eq5); wherein the updating further includes, if value of one of the training metric TM and the training metric candidate New_TM is larger than that of the other, setting the transmission interval to D+A for training step A, and performing the transmitting again, if the value of the training metric TM equals to the value of the training metric candidate New_TM, determining the transmission period as D or D−Δ, and otherwise, determining the transmission period as D−Δ.

The fourth aspect of the present invention is a transmission period determination device for determining a transmission period at which a source node transmits a packet to a destination node, comprising an estimation unit that receives estimates training time T for the destination node to receive a plurality of training packets transmitted from the source node to the destination node at a transmission interval D and received by the destination node during training operation time, based on a first training packet and a last training packet received by the destination node; a calculation unit that calculates a training metric candidate New_TM based on the training time T; and an updating unit that compares a value of training metric TM and the training metric candidate New_TM, and if value of one of the training metric candidate New_TM and the training metric is larger than that of the other, value of the training metric candidate New_TM is set to value of the training metric TM, changes the transmission interval D, and makes the source node transmit the plurality of training packets again, and if the training metric candidate New_TM equals to the training metric, determines the transmission period.

The fifth aspect of the present invention is a program for determining a transmission period at which a source node transmits a packet to a destination node, by causing a computer to function as an estimation unit that receives estimates training time T for the destination node to receive a plurality of training packets transmitted from the source node to the destination node at a transmission interval D and received by the destination node during training operation time, based on a first training packet and a last training packet received by the destination node; a calculation unit that calculates a training metric candidate New_TM based on the training time T; and an updating unit that compares a value of training metric TM and the training metric candidate New_TM, and if value of one of the training metric candidate New_TM and the training metric is larger than that of the other, value of the training metric candidate New_TM is set to value of the training metric TM, changes the transmission interval D, and makes the source node transmit the plurality of training packets again, and if the training metric candidate New_TM equals to the training metric, determines the transmission period.

Here, another aspect of the present invention is the transmission period determination method including the updating including, if the training metric candidate New_TM is larger than the present training metric TM, updating the transmission interval D and performing the transmitting again, and if the training metric candidate New_TM equals to the present training metric or less, determining the transmission period at which packets are transmitted to the destination node.

Another aspect of the present invention is a non-transitory computer-readable medium storing the program of the fifth aspect.

Equation 1

$$\delta = \frac{T_2 - T_1}{Seq_2 - Seq_1}, \quad \text{(eq 1)}$$

$$T_{start} = T_1 - \delta \times (Seq_1 - 1), \quad \text{(eq 2)}$$

$$T_{end} = T_2 + \delta \times (N - Seq_2), \quad \text{(eq 3)}$$

$$T = T_{end} - T_{start}, \quad \text{(eq 4)}$$

$$\text{New\_TM} = \frac{Num}{T}. \quad \text{(eq 5)}$$

Advantageous Effects of Invention

According to the present invention, training metric candidate New_TM is calculated based on a first training packet and a last training packet received by the destination node. Thus, it is not necessary to define a new control packet. Therefore, according to the present invention, transmission period (IPT transmission period) can be set without changing the specifications such as IEEE802.11 or the like. That is, the transmission period determination method in accordance with the present invention is easier to implement for a universal wireless module with conventional driver.

According to the second aspect of the present invention, training time T is estimated, by an estimation unit, based on the time points for the destination node to receive the first training packet transmitted first by the source node and the last training packet transmitted last by the source node. Thus, by taking missing packets during forwarding into consideration, the estimation with more accuracy can be provided. Further, the training metric candidate New_TM is calculated, by a calculation unit, based on the ratio of the training time T and a number Num of training packets received without overlap by the destination node. Therefore, it is possible to evaluate the End to End throughput from the core node to the targeted slave node, and to determine a transmission period.

Further, according to the third aspect of the present invention, estimation with more accuracy can be provided based on the equations (eq1) through (eq5). Further, by evaluating the training metric while increasing the transmission period by training step Δ, it is possible to determine the transmission at the time point when the value of the training metric takes a downward turn or at the time point when the value of the training metric takes a upward turn

DESCRIPTION OF EMBODIMENTS

Description will be made regarding embodiments of the present invention with reference to the drawings. It should be noted that the present invention is not restricted to such embodiments.

Example

Figure 1:
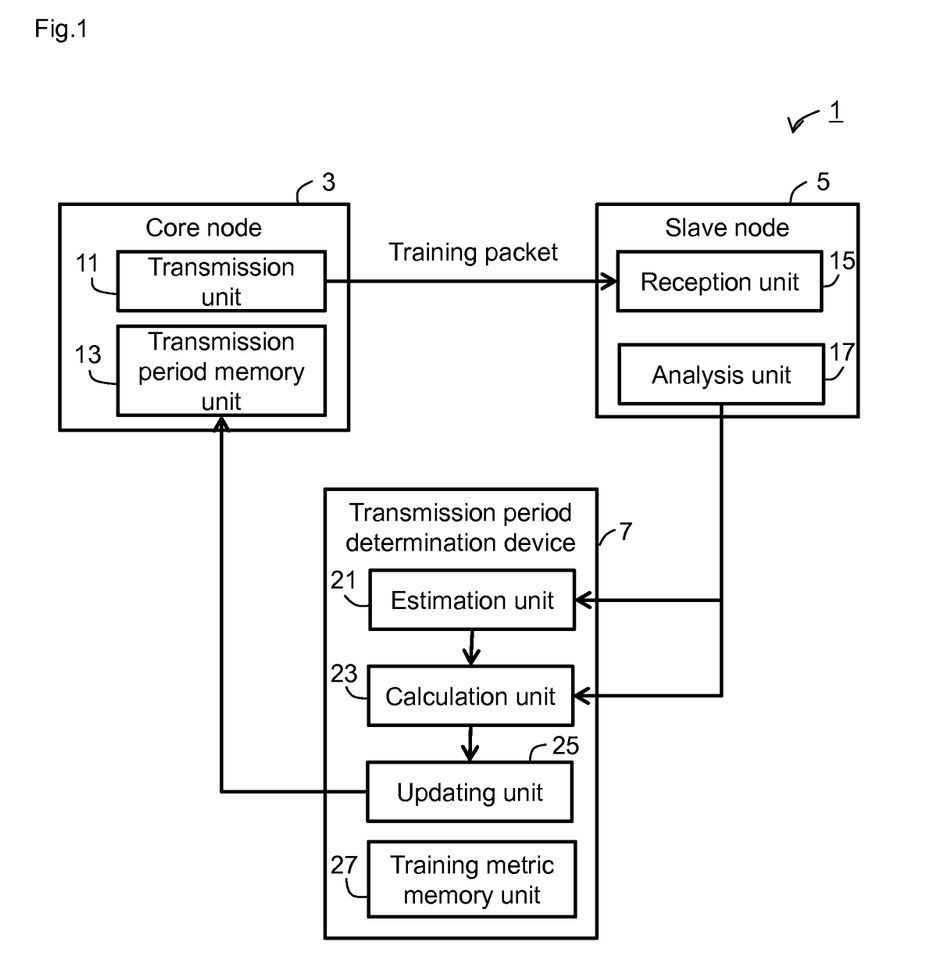
FIG. 1 is a block diagram showing a schematic configuration of a wireless communication system 1 according to an embodiment of the present invention.

FIG. 1 is a block diagram showing a schematic configuration of a wireless communication system according to an embodiment of the present invention. A wireless communication system 1 (an example of "an intermittent periodic transmit system" in Claims) includes some core nodes and pluralities of slave nodes. Core nodes are connected with backbone network. Each slave node is connected to backbone network by wireless multihop forwarding to a core node.

In the wireless communication system 1, a slave node 5 (an example of "a destination node" in Claims) is connected to backbone network via a core node 3 (an example of "a source node" in Claims). The communication route is determined on ahead. Plenty of methods are proposed for determining such communication routes by the present inventors (See Patent Literature 1, Non Patent Literature 1, for example). In the wireless communication system 1, packets are transmitted from the core node 3 to slave node 5 by IPT. That is, the core node 3 transmits packets to the slave node 5 at an IPT transmission period (an example of "a transmission period" in Claims). In this embodiment, described is the protocol for a transmission period determination device 7 (an example of "a transmission period determination device" in Claims) to determine automatically the IPT transmission period at which packets are transmitted to the slave node 5.

The core node 3 includes a transmission unit 11 and a transmission interval memory unit 13. The transmission unit transmits n of training packets (an example of "a training packet" in Claims) to the slave node 5 at a transmission interval D (an example of "a transmission interval" in Claims). In this embodiment, the training packets are $L_2$ data packets with packet length of 1,450 bites. Each training packet is given a sequence number. Each training packet is identified from other training packets by the sequence numbers. The transmission interval D is $D_0$ (unit is μsec) initially, and is increased by Δ (unit is μsec), a training step. The transmission interval memory unit 13 stores the transmission interval D.

The slave node 5 includes a reception unit 15 and an analysis unit 17. The reception unit 15 receives the training packets transmitted by the transmission unit 11 during training operation time. The training operation time is the time determined on ahead. The training packets may cause collision because of mutual interference between two nodes, for example. Thus, the reception unit 15 cannot necessarily receive all the training packets during the training operation time. Besides, the reception unit 15 may receive the same training packet with the training packet already received because of retransmit of training packets, for example. Thus, the analysis unit 17 analyzes the received training packets to identify the sequence number and the reception time point $(Seg_1, T_1)$ of the training packet received first, the sequence number and the reception time point $(Seq_2, T_2)$ of the training packet received last, and the number Num of training packets received without overlap by counting redundantly received training packets as one packet. The analysis unit 17 transmits the analysis result as report packets to the transmission period determination device 7.

The transmission period determination device 7 includes an estimation unit 21 (an example of "an estimation unit" in Claims), a calculation unit 23 (an example of "a calculation unit" in Claims), an updating unit 25 (an example of "an updating unit" in Claims), and a training metric memory unit 27.

The estimation unit 21 estimates training time T based on the sequence number and the reception time point $(Seg_1, T_1)$ of the training packet received first, the sequence number and the reception time point $(Seq_2, T_2)$ of the training packet received last. The training time T is estimated as necessary time for receiving all of the n training packets.

The estimation unit 21 first calculates transmission time δ per one training packet received based on (eq1). The estimation unit 21, based on (eq2), calculates the time point $T_{start}$ at which the packet transmitted from the core node 3 first should be received. In (eq2), $δ×(Seq_1−1)$ denotes the time point at which the missing packet transmitted first is received. By subtracting this time point from $T_1$, the reception time point $T_{start}$ is calculated. Similarly, the time point $T_{end}$ at which the packet transmitted last from the core node 3 should be received is calculated as shown in (eq3). In (eq3), $δ×(N−Seq_2)$ denotes the time point at which the missing packet transmitted last is received. By adding this time point to $T_2$, the reception time point $T_{end}$ is calculated. These calculations are based on the consideration that missing packets during transmission of training packets can occur because of unstable wireless communication route, packet collision or the like. And based on (eq4), the training time T is estimated as $T_{end}−T_{start}$.

The calculation unit 23 calculates a training metric candidate New_TM based on the training time T and the number Num of training packets received without overlap. Using equation (eq5), the End to End throughput from the core node 3 to the slave node 5 can be substantially estimated. Thus, by determining the transmission period as the transmission interval at which the value of the training metric candidate becomes maximum, the throughput of the system can be maximized.

The training metric memory unit 27 stores the training metric TM.

The updating unit 25 compares the value of training metric TM at present stored in the training metric memory unit 27 and the training metric candidate New_TM. If the training metric candidate New_TM is larger than the training metric TM, the transmission interval stored in the transmission interval memory unit 13 is changed into D+Δ, and the updating unit 25 makes the transmission unit 11 transmits pluralities of training packets again. If the training metric candidate New_TM equals to the training metric TM or less, the throughput is maximum at the previous transmission interval. Thus, the updating unit 25 determines the transmission interval at which the core node 3 transmits packets to the slave node 3 as D−Δ.

Here, the transmission period determination device 7 and the core node 3 may be a single device.

Equation 2

$$\delta = \frac{T_2 - T_1}{Seq_2 - Seq_1}, \quad \text{(eq 1)}$$

$$T_{start} = T_1 - \delta \times (Seq_1 - 1), \quad \text{(eq 2)}$$

$$T_{end} = T_2 + \delta \times (N - Seq_2), \quad \text{(eq 3)}$$

$$T = T_{end} - T_{start}, \quad \text{(eq 4)}$$

$$New\_TM = \frac{Num}{T}. \quad \text{(eq 5)}$$

Figure 2:
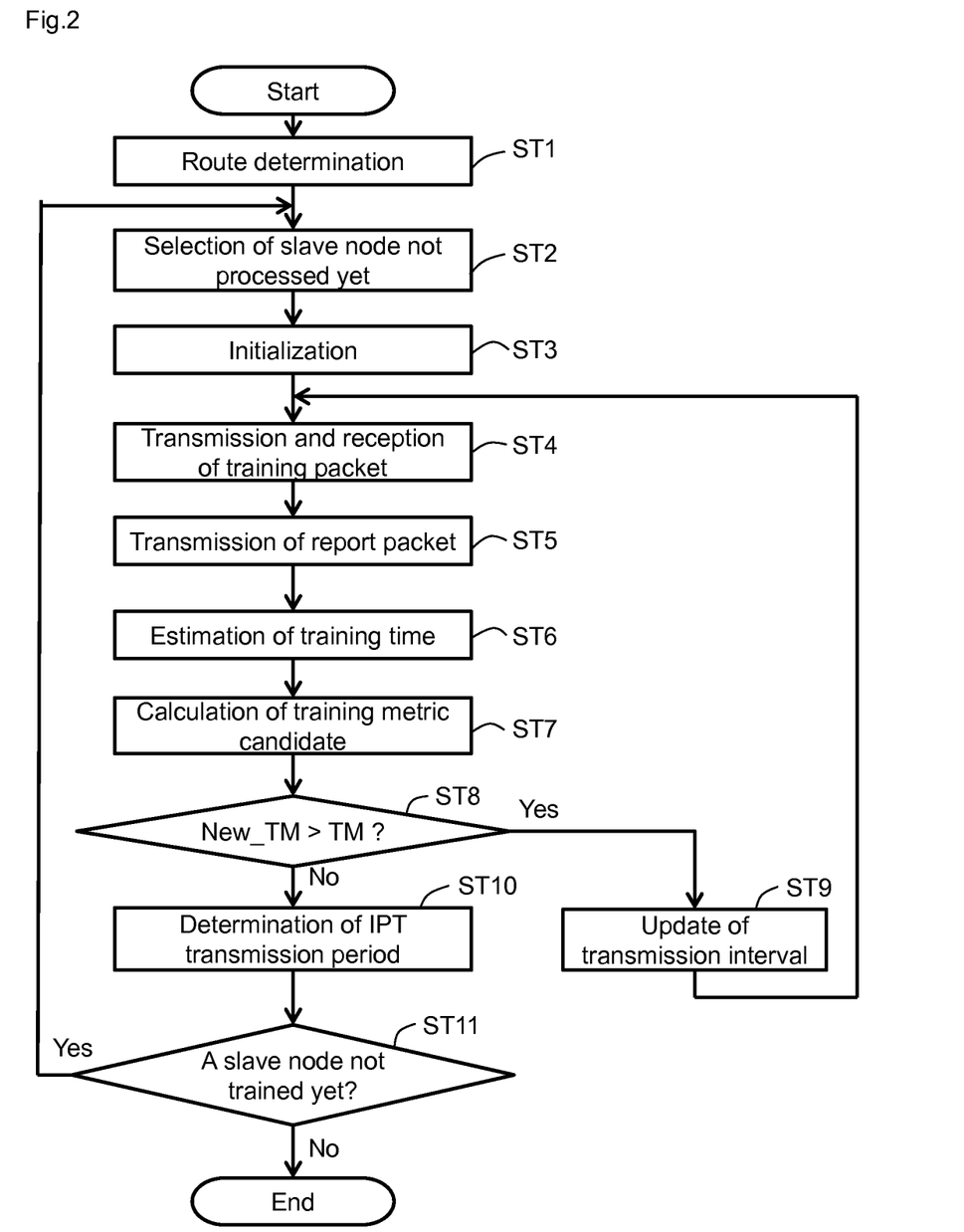
FIG. 2 is a schematic flowchart showing the process in the wireless communication system 1 in FIG. 1.

FIG. 2 is a schematic flowchart showing the process in the wireless communication 1 in FIG. 1. The wireless communication system 1 is a wireless backhaul, and the communication route is determined (step ST1). Next, the transmission unit 11 of the core node 3 selects a slave node not processed yet (step ST2). The updating unit 25 sets an initial transmission interval to the value stored in the transmission interval memory unit 13. The updating unit 25 sets an initial training metric stored in the training metric memory unit 27 (step ST3).

The transmission unit 11 transmits n training packets whose sequence numbers are 1, . . . , N at the given transmission interval to the selected slave node (the slave node 5 in FIG. 1). The reception unit 15 of the slave node 5 receives training packets (step ST4). The analysis unit records the sequence numbers of training packets, the reception time point, and the number of received packets. The analysis unit 17 transmits a report packet to the transmission period determination device 7 when the slave node 5 finishes receiving the packets addressed to the slave node 5 (step ST5). Included in the report packets are the sequence number and the reception time point (Seq$_1$, T$_1$) of the training packet received first, the sequence number and the reception time point (Seq$_2$, T$_2$) of the training packet received last, and the number Num of training packets received without overlap.

The estimation unit 21 estimates training time T based on equations (eq1) thorough (eq4) when the transmission period determination device 7 receives the report packet (step ST6).

Next, the calculation unit 23 calculates a training metric candidate New_TM based on equation (eq5) (step ST7). The updating unit 25 compares the value of training metric TM stored in the training metric memory unit and the value of the training metric candidate New_TM (step ST8). If New_TM>TM, the process moves to step ST9. Otherwise, the process moves to step ST10.

IN step ST9, the updating unit 25 makes the training metric memory unit 27 store New_TM as a new training metric. The updating unit 25 makes the transmission interval memory unit 13 store D+Δ as a new D. Then, the process moves back to step ST4.

In step ST9, the updating unit 25 finishes the training of the slave node 5 and determines D−Δ as the IPT transmission period of the slave node 5. Then, the updating unit 25 judges if there is a slave node not trained yet (step ST11). If there is a slave node not trained yet, the process moves back to step ST2. If there is not, the process ends.

The protocol proposed in this embodiment can be summarized as the following. In this protocol, a core node transmits training packets to each slave node and IPT transmission period is determined so that the training metric becomes maximum value. In addition, in this protocol, the process is executed after the route of the wireless backhaul is determined, and it is presupposed that the route of the system is not changed during the protocol execution. Then, as a result of the protocol, the End to End throughput between the core node and each slave node in the wireless backhaul comes to the maximum value when IPT transmission period is set to the most proper value.

In the following, C denotes a core node, and {S$_1$, S$_2$, . . . , S$_n$} denote slave nodes belonging to C (that is, the slave nodes are connected to backbone network via C). The core node C executes such process to each slave node S∈={S$_1$, S$_2$, . . . , S$_n$} as shown in the following after the communication route in the system is determined.

(1) The core node C initializes a training metric TM as TM=−1 for slave nodes S.

(2) The core node transmits whose sequence numbers are 1, 2, . . . , N to a slave node S. Here, successive packets have transmission interval D, whose initial value is D$_0$.

(3) The slave node S records the sequence numbers of received packets, reception time point, and the number of received packets when the slave node S receives training packets addressed to the slave node S.

(4) The slave node S transmits a report packet to the transmission period determination device 7 when the slave node S finishes receiving the training packets addressed to the slave node S. Included in the report packets are the sequence number and the reception time point (Seq$_1$, T$_1$) of the training packet received first, the sequence number and the reception time point (Seq$_2$, T$_2$) of the training packet received last, and the number Num of training packets received without overlap.

(5) The transmission period determination device 7 estimates training time T based on equations (eq1) thorough (eq4) when the transmission period determination device 7 receives the report packet from the slave node S. And the transmission period determination device 7 calculates a training metric candidate New_TM based on equation (eq5).

(6) If New_TM equals to TM or less, the updating unit 25 finishes the training of the slave node S, determines D−Δ as the IPT transmission period of the slave node S, and starts the training of the next slave node. If New_TM is larger than TM, the updating unit 25 sets New_TM to a new TM, sets D+Δ to a new D, and repeats steps (2) thorough (5).

(7) The core node C repeats the steps (1) thorough (6) until the training of every slave node S∈{S₁, S₂, ..., Sₙ} is finished.

In the following, an IPT transmission period measured manually and the IPT transmission period obtained by simulation are compared to evaluate the proposed protocol.

The parameters set in a simulator for the simulation are listed in Table 1. In the simulation, the throughput is calculated using equation (eq6). Wireless backhauls are constructed in both sites of scenario 1 and scenario 2 using the parameters listed in Table 1 and the proposed protocol is implemented. First, IPT transmission period of each slave node is measured manually in both scenarios to obtain the IPT transmission period at which the throughput becomes maximum value. Then, the proposed protocol is executed to calculate the IPT transmission period of each slave node, which is compared with the manually measured value.

Figure 3:
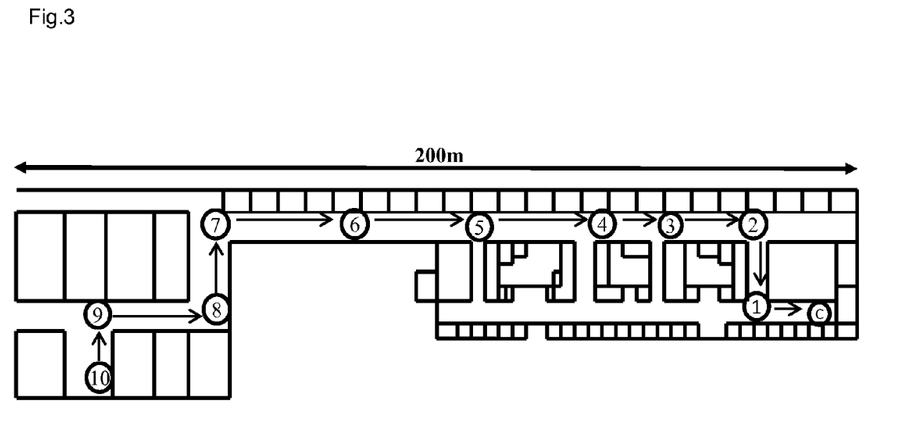
FIG. 3 is a diagram showing a wireless backhaul of string topology constructed in a simulation scenario 1.

In the simulation scenario 1, the wireless backhaul of string topology is constructed as shown in FIG. 3. The End to End throughput is measured for each slave node. In the measurement of the throughput, 2000 data packets are transmitted at the given IPT transmission period, and the throughput is calculated in the receiving slave node using equation (eq6). The manually measured values are shown in Table 2. The automatically calculated values by the proposed protocol are shown in Table 3.

Figure 4:
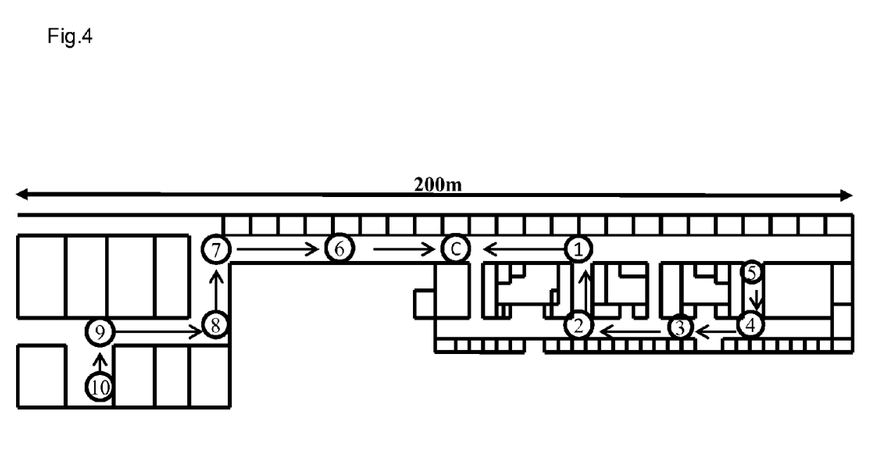
FIG. 4 is a diagram showing a wireless backhaul of tree topology constructed in a simulation scenario 2.
Figure 5:
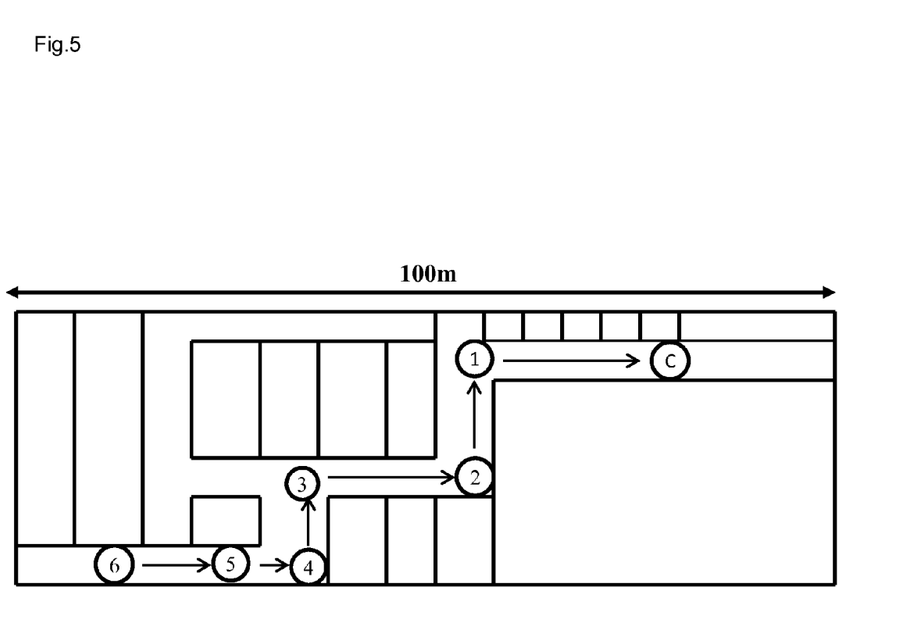
FIG. 5 is a diagram showing a wireless backhaul constructed in an experimental scenario using actual machines.

In the simulation scenario 2, the wireless backhaul of tree topology is constructed as shown in FIG. 4. In the measurement of the throughput, 2000 data packets are transmitted at the given IPT transmission period, and the throughput is calculated in the receiving slave node using equation (eq6). The manually measured values are shown in Table 4. The automatically calculated values by the proposed protocol are shown in Table 5.

In both of the two scenarios, IPT transmission periods calculated by the proposed protocol agree with the optimal IPT transmission period manually measured IPT transmission period. Besides, the proposed protocol finishes in dozens of seconds even in the case where the number of training packets is as many as 1000.

TABLE 1

| | |
|---|---|
| MAC model | Compliant with IEEE802. 11a, Basic mode, Number of re-forwarding = 3. |
| PHY model | Minimum SINR = 10 dB. If the SINR of receiving packets is the minimum value or more, the reception is successful with probability 1. |
| Propagation channel model | 2 Ray Ground Reflection model. |
| Shadowing | Only attenuation by walls (12 dB). |
| Fading | None. |
| Path routing | Minimum path loss routing. |
| Number of nodes | One core node + 10 slave nodes. |
| Data packet length | 1500 bites. |

Equation 3

$$Throughput = \frac{Number\_of\_packets\_without\_overlap \times Packet\_length}{Transmission\_time} \quad (eq\ 6)$$

TABLE 2

| IPT | Throughput of each node (Kbps) | | | | | | |
|---|---|---|---|---|---|---|---|
| (μsec) | 10 | 9 | 8 | 7 | 6 | 5 | 4 |
| 0 | 3083.9 | 3203.1 | 3404.3 | 3510.5 | 4148.7 | 4682.7 | 7233.6 |
| 700 | 3684.9 | 3710.4 | 3725.8 | 3842.0 | 4244.3 | 5058.9 | 7815.6 |
| 1000 | 3969.8 | 4021.8 | 4241.2 | 4245.8 | 4623.2 | 6077.7 | 8106.4 |
| 1300 | 4059.3 | 4263.8 | 4291.6 | 4417.7 | 4807.1 | 6233.0 | 6970.5 |
| 1600 | 4234.9 | 4411.5 | 4591.1 | 4760.9 | 5127.5 | 5902.0 | 5997.7 |
| 1900 | 5057.6 | 5069.2 | 5100.3 | 5162.4 | 4882.7 | 5165.6 | 5146.5 |
| 2200 | 4560.3 | 4625.4 | 4591.5 | 4559.4 | 4594.9 | 4618.4 | 4742.8 |

TABLE 3

| N | Δ | 4 | 5 | 6 | 7 | 8 | 9 | 10 | Protocol operation time |
|---|---|---|---|---|---|---|---|---|---|
| 100 | 300 | 1000 | 1000 | 1000 | 1600 | 1900 | 1900 | 1900 | 3.88 sec |
| 300 | 300 | 1000 | 1300 | 1600 | 1900 | 1900 | 1900 | 1900 | 11.68 sec |
| 500 | 300 | 1000 | 1300 | 1600 | 1900 | 1900 | 1900 | 1900 | 19.47 sec |
| 1000 | 300 | 1000 | 1300 | 1600 | 1900 | 1900 | 1900 | 1900 | 38.69 sec |

TABLE 4

| IPT | Throughput of each node (Kbps) | | | |
|---|---|---|---|---|
| (μsec) | 10 | 9 | 5 | 4 |
| 0 | 5146.712 | 6250.908 | 5675.874 | 7190.515 |
| 700 | 4962.676 | 5960.067 | 6110.178 | 8096.292 |
| 800 | 5305.039 | 6419.364 | 6213.759 | 8197.841 |
| 900 | 6248.718 | 6974.799 | 6341.753 | 8209.956 |
| 1000 | 6943.038 | 6983.890 | 6386.959 | 8326.279 |
| 1100 | 6994.748 | 7388.798 | 6388.619 | 7706.882 |
| 1200 | 7353.887 | 7567.595 | 6413.371 | 7384.206 |
| 1300 | 7529.601 | 7882.809 | 6424.086 | 6913.677 |
| 1400 | 6578.154 | 6596.052 | 6362.571 | 6594.892 |
| 1500 | 6238.335 | 6280.782 | 6144.173 | 6257.431 |
| 1600 | 5909.304 | 5928.326 | 5917.889 | 5961.488 |
| 1900 | 5194.557 | 5206.548 | 5151.187 | 5205.419 |

TABLE 5

| N | Δ | Node 4 | Node 5 | Node 9 | Node 10 | Protocol operation time |
|---|---|---|---|---|---|---|
| 100 | 300 | 1000 | 1000 | 1000 | 1000 | 1.38 sec |
| 300 | 300 | 1000 | 1300 | 1300 | 1300 | 5.00 sec |
| 500 | 300 | 1000 | 1300 | 1300 | 1300 | 8.31 sec |
| 1000 | 300 | 1000 | 1300 | 1300 | 1300 | 16.6 sec |

Further, the evaluation based on the examination is described. That is, the IPT transmission period calculated automatically when the proposed protocol is implemented into the actual testbed is compared with the value measured manually.

PicoMesh LunchBox (LB) is used as an actual testbed. The main specifications of LB are listed in Table 6. In the experimental scenario, the wireless backhaul is constructed with a core node and six slave nodes in the ninth floor of W4 building in Ito campus of Kyushu university. After the communication route is determined, the End to End throughput is measured for slave nodes 3, 4, 5, and 6. Here, iPerf is used for the throughput measurement and every measurement time is 30 seconds. The values of IPT transmission period measured manually are shown in Table 7. The values calculated automatically by the actual testbed into which the proposed protocol is implemented are shown in Table 8.

Referring to Table 7 and 8, the IPT transmission periods calculated by the proposed protocol agree well with the optimal values measured manually.

TABLE 6

| CPU | AMD Geode LX800 |
|---|---|
| Memory | DDR 512 MB |
| Backhall Wireless IF | IEEE802. 11 b/g/a × 2 |
| Access Wireless IF | IEEE802. 11 b/g/a × 1 |
| 0S | Linux kernel 2.6 |

TABLE 7

| IPT | Throughput of each node (Kbps) | | | |
|---|---|---|---|---|
| (μsec) | 3 | 4 | 5 | 6 |
| 0 | 4.57 | 4.18 | 3.47 | 3.34 |
| 700 | 4.73 | 4.58 | 4.22 | 3.66 |
| 1000 | 7.04 | 5.81 | 5.53 | 3.76 |
| 1300 | 6.68 | 6.48 | 6.20 | 5.22 |
| 1600 | 5.70 | 5.29 | 5.05 | 3.92 |
| 1900 | 4.26 | 4.29 | 4.25 | 3.36 |
| 2200 | 4.07 | 3.68 | 3.60 | 2.85 |

TABLE 8

| N | Δ | Node 3 | Node 4 | Node 5 | Node 6 | Protocol operation time |
|---|---|---|---|---|---|---|
| 1000 | 300 | 1000 | 1300 | 1300 | 1300 | <15 sec |

REFERENCE SIGNS LIST

1 wireless communication system, 3 core node, 5 slave node, 7 transmission period determination device, 21 estimation unit, 23 calculation unit, 25 updating unit

The invention claimed is:

1. A transmission period determination method for determining a transmission period in an intermittent periodic transmit system where a source node transmits a packet at the transmission period to a destination node, comprising:
   transmitting a plurality of training packets at a transmission interval D from the source node to the destination node;
   estimating training time T required for the plurality of training packets received by the destination node, based on a first training packet received by the destination node during training operation time and on a last training packet received by the destination node during the training operation time;
   calculating a training metric candidate New_TM based on the training time T; and
   updating by comparing a value of training metric TM and the training metric candidate New_TM, and if the training metric candidate New_TM is larger than the training metric TM, by setting value of the training metric candidate New_TM to value of the training metric TM, changing the transmission interval D, and performing the transmitting again, and if the training metric candidate New_TM equals to the training metric or less, by determining the transmission period.

2. The transmission period determination method of claim 1,
   wherein the estimating further includes estimating time points $T_{start}$ and $T_{end}$ which are time points for the destination node to receive the first training packet transmitted first by the source node and the last training packet transmitted last by the source node, respectively, and estimating the training time T as $T_{end} - T_{start}$; and
   wherein the calculating further includes calculating the training metric candidate New_TM based on ratio of the training time T and a number Num of training packets received without overlap by the destination node.

3. The transmission period determination method of claim 2,
   wherein the estimating further includes the training time T based on (eq4) for a number N of the training packets transmitted from the source node, and sequences Seq1 and Seq2 by which the first training packet and the last training packet are transmitted from the source node, respectively;
   wherein the calculating further includes calculating the training metric candidate New_TM based on (eq5);
   wherein the updating further includes, if value of one of the training metric TM and the training metric candidate New_TM is larger than that of the other, setting the transmission interval to D+Δ for training step Δ, and performing the transmitting again, if the value of the training metric TM equals to the value of the training metric candidate New_TM, determining the transmission period as D or D−Δ, and otherwise, determining the transmission period as D−Δ.

$$\delta = \frac{T_2 - T_1}{Seq_2 - Seq_1}, \quad (eq\ 1)$$

$$T_{start} = T_1 - \delta \times (Seq_1 - 1), \quad (eq\ 2)$$

$$T_{end} = T_2 + \delta \times (N - Seq_2), \quad (eq\ 3)$$

$$T = T_{end} - T_{start}, \quad (eq\ 4)$$

$$New\_TM = \frac{Num}{T}. \quad (eq\ 5)$$

4. A transmission period determination device for determining a transmission period at which a source node transmits a packet to a destination node, comprising:

an estimation unit that receives estimates training time T for the destination node to receive a plurality of training packets transmitted from the source node to the destination node at a transmission interval D and received by the destination node during training operation time, based on a first training packet and a last training packet received by the destination node;

a calculation unit that calculates a training metric candidate New_TM based on the training time T; and an updating unit that compares a value of training metric TM and the training metric candidate New_TM, and if value of one of the training metric candidate New_TM and the training metric is larger than that of the other, value of the training metric candidate New_TM is set to value of the training metric TM, changes the transmission interval D, and makes the source node transmit the plurality of training packets again, and if the training metric candidate New_TM equals to the training metric, determines the transmission period.

* * * * *